(12) United States Patent
Mane et al.

(10) Patent No.: US 11,050,560 B2
(45) Date of Patent: Jun. 29, 2021

(54) SECURE REUSABLE ACCESS TOKENS

(71) Applicant: International Business Machines Corporation, Armonk, NY (US)

(72) Inventors: Amit Mane, Bangalore (IN); Shinoj Zacharias, Bangalore (IN); Vivin Krishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/585,879

(22) Filed: Sep. 27, 2019

(65) Prior Publication Data

US 2021/0099297 A1    Apr. 1, 2021

(51) Int. Cl.
| | |
|---|---|
| *H04L 29/06* | (2006.01) |
| *H04L 9/08* | (2006.01) |
| *H04L 9/32* | (2006.01) |
| *G06F 21/72* | (2013.01) |
| *H04L 9/30* | (2006.01) |

(52) U.S. Cl.
CPC ............ *H04L 9/0869* (2013.01); *H04L 9/088* (2013.01); *H04L 9/0866* (2013.01); *H04L 9/0894* (2013.01); *H04L 9/3213* (2013.01)

(58) Field of Classification Search
CPC ..... H04L 9/0866; H04L 9/0869; H04L 9/088; H04L 9/0894; H04L 9/3213
See application file for complete search history.

(56) References Cited

U.S. PATENT DOCUMENTS

| | | | | |
|---|---|---|---|---|
| 6,065,117 | A * | 5/2000 | White | G06Q 20/367 380/255 |
| 6,073,125 | A * | 6/2000 | Cordery | G06Q 10/107 705/60 |
| 7,035,854 | B2 | 4/2006 | Hsiao | |
| 9,444,809 | B2 | 9/2016 | Ganesan | |
| 2002/0169740 | A1* | 11/2002 | Korn | G06F 16/1756 |
| 2011/0119240 | A1* | 5/2011 | Shapira | G06F 16/10 707/693 |
| 2013/0191884 | A1 | 7/2013 | Leicher | |
| 2017/0006020 | A1* | 1/2017 | Falodiya | H04L 63/0838 |

(Continued)

FOREIGN PATENT DOCUMENTS

| | | |
|---|---|---|
| WO | 2016050891 A1 | 4/2016 |
| WO | 2018029564 A1 | 2/2018 |

OTHER PUBLICATIONS

"What if JWT is stolen?", 5 pps., edited Dec. 14, 2015, <https://stackoverflow.com/questions/34259248/what-if-wt-is-stolen>.

(Continued)

*Primary Examiner* — Mohammad A Siddiqi
(74) *Attorney, Agent, or Firm* — Daniel R. Simek

(57) ABSTRACT

A method for accessing a resource utilizing a reusable access token. The method includes one or more computer processors generating an initial token, wherein the initial token is associated with a remotely stored backup copy of the initial token. The method further includes transmitting the initial token to a client device. The method further includes receiving a modified token from the client device. The method further includes responding to receiving the modified token by determining that the received modified token is valid. The method further includes responding to determining that the received modified token is valid by granting access to a protected resource.

14 Claims, 4 Drawing Sheets

(56) References Cited

U.S. PATENT DOCUMENTS

| | | | |
|---|---|---|---|
| 2017/0374060 A1 | 12/2017 | Flamini | |
| 2018/0367306 A1 | 12/2018 | Bahety | |
| 2019/0158288 A1* | 5/2019 | Williamson | ........ H04L 9/3213 |
| 2020/0092097 A1* | 3/2020 | Chiu | ................ G06Q 20/3678 |
| 2020/0244465 A1* | 7/2020 | Ramzan | ............... H04L 9/0643 |

OTHER PUBLICATIONS

Degges, "What Happens If Your JWT Is Stolen?", Jun. 20, 2018, 14 pps., <https://developer.okta.com/blog/2018/06/20/what-happens-if-your-jwt-is-stolen>.

Kiani, "Four Attacks on OAuth—How to Secure Your OAuth Implementation", SANS Institute Information Security Reading Room, vol. 3/1, 13 pps., last updated Jun. 11, 2019, <www.sans.org/info/39149>.

Lodderstedt, Ed.,. et al., "OAuth 2.0 Security Best Current Practice", May 20, 2018, 19 pps., Open Authentication Protocol Internet-Draft, Intended status: Best Current Practice, Expires: Nov. 21, 2018, <https://tools.ietf.org/id/draft-ietf-oauth-security-topics-06.html>.

\* cited by examiner

SECURE REUSABLE ACCESS TOKENS

BACKGROUND OF THE INVENTION

The present invention relates generally to the field of computer security, and more particularly to utilizing tokens to access a protected resource.

Access tokens are used in some authorization mechanisms where client application obtains a token from authorization server by providing credentials. Client can use this token to access restricted resources without having to go through authenticating itself by sharing credentials with resource server again. The access token once obtained can be reused multiple times to access restricted resource until the access token expiries. In response to the access token expiring, a client repeats the authentication and authorization processes to obtain a new access token.

For example, OAuth is an open standard for access delegation, commonly used as a way for Internet users to grant websites or applications access to their information on other websites but without giving them the passwords. OAuth provides clients with a "secure delegated access" to server resources on behalf of a resource owner. OAuth specifies a process for resource owners to authorize third-party access to protected resources hosted on a server of a resource owner without sharing their credentials with the resource servers. OAuth essentially allows access tokens to be issued to third-party clients by an authorization server, with the approval of the resource owner. In response, a third-party client utilizes the access token to access the protected resources hosted by the resource serve.

SUMMARY

According to an aspect of the present invention, there is a method, computer program product, and/or system for accessing a resource utilizing a reusable access token. In an embodiment, the method includes at least one computer processor generating an initial token, where the initial token is associated with a remotely stored backup copy of the initial token. The method further includes at least one computer processor transmitting the initial token to a client device. The method further includes at least one computer processor receiving a modified token from the client device. The method further includes at least one computer processor responding to receiving the modified token by determining that the received modified token is valid. The method further includes at least one computer processor responding to determining that the received modified token is valid by granting access to a protected resource.

DETAILED DESCRIPTION

Figure 1:
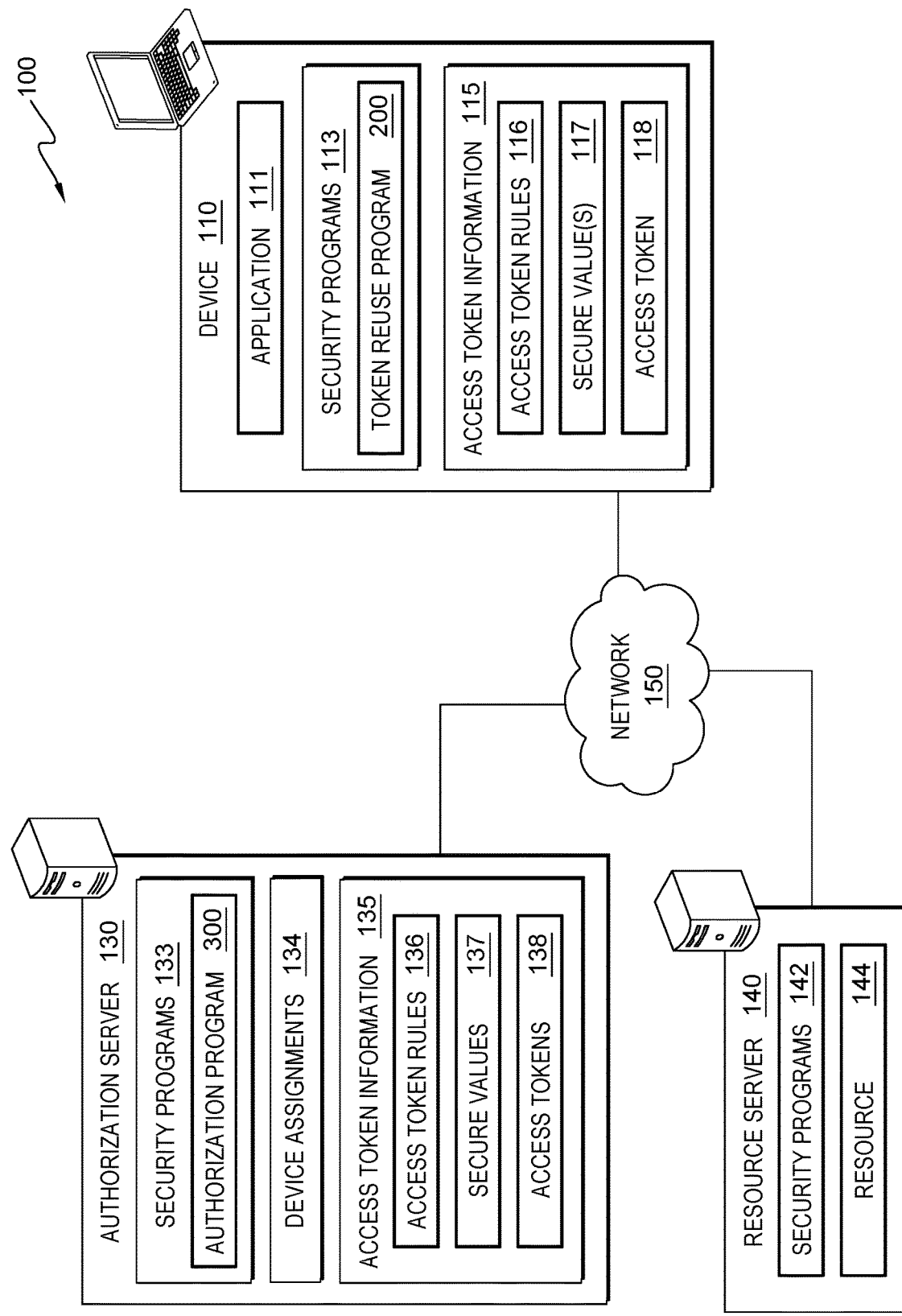
FIG. 1 illustrates a networked-computing environment, in accordance with an embodiment of the present invention.

Embodiments of the present invention recognize that access tokens are used to avoid frequent authentications. Utilizing access tokens enables a client (e.g., a user, another system) to avoid sharing credentials of the client with resource servers that include the protected resources that the client is accessing. In response to a successful authentication by a client, the client can interact with authorization server to obtain an access token and thereafter, the client uses the token to gain access to one or more resources of the resource server that is associated with the authorization server. Embodiments of the present invention recognize that because tokens are reusable, access tokens can be misused if a malicious actor copies or obtains the access tokens. A successful man-in-middle attack can allow the malicious actor to capture the access token and identify at least the resource server that the client is accessing utilizing the access token. As such, captured access tokens can be used to gain access to a resource server until the time captured or copied access token expires or is revoked by the authorization server.

Embodiments of the present invention create an access token that, if captured or copied by a man-in-middle attack or other malicious activity, cannot be reused by an entity different from the client that obtained the access token. Embodiments of the present invention generate a secure reusable access token by creating an access token that includes at least one segment of information, hereinafter referred to as a secure value that is altered (e.g., changes) for each access session of a protected resource on a resource server. Thus, improving security by preventing a malicious entity from impersonating a legitimate client by using a captured or compromised access token that was issued to a client to access the protected resource. Embodiments of the present invention modify the secure value and the location of the secure value within the reusable access token based on one or more rules and/or algorithms that an authorization server assigns to a particular client. Thus, embodiments of the present invention create an access token that is reusable but is effectively unique for each exchange (e.g., session) between the client and the resource server until the token expires.

Embodiments of the present invention utilize a multi-step process during the initial authorization, access token generation, and access grant to a protected resource. In response to authenticating a user for the first time to at least a one resource server, the authorization server establishes a set of predefined algorithms, functions, rules, and/or values that are respectively assigned to the user (e.g., client) and a device of the user. The authorization server can download (e.g., install, copy) the established set of set of predefined algorithms, functions, rules, and/or values to the device of the user. The reusable access token from the authorization server can be related to a particular resource, a group of resources, or a resource server. The set predefined algorithms, functions, rules, and/or values that are installed on the device of the user are utilized to identify and extract a seed value (e.g., an initial condition) in the initial token. The set predefined algorithms, functions, rules, and/or values utilize the seed value to generate a secure value. The secure value is inserted within the initial token, sans seed value, creating a modified access token. A valid modified access token grants access to a protected resource for some or all of the duration associated with the current access session (e.g., exchange).

Embodiments of the present invention further utilize the predefined set of algorithms, functions, rules, and/or values to generate and replace secure values within the reusable access token for each subsequent access of a protected resource. Some embodiments of the present invention can pre-emptively generate a subsequent instance of the reusable access token to minimize the delay in re-authorizing access to the protected resource. For example, a protected resource may include an access time-out provision based on a lack of access for a period of time or an access duration greater than a defined threshold period of time.

Other embodiments of the present invention can utilize combinations of predefined rules, algorithms, and/or values to obfuscate a secure value within an instance of the reusable access token by modifying the location of each new secure value. For example, one rule may dictate that the secure value location for even numbered authorizations is identified based on a usage-varying string of metadata. The rule may further dictate a location (e.g., insertion point, index value within the token data) of the secure value for odd numbered authorization is based on one of the algorithms respectively assigned to the device of the user that generate pseudorandom locations that can be reproduced by the authorization server.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked computing environment 100, in accordance with embodiments of the present invention. In an embodiment, networked computing environment 100 includes device 110, authorization server 130, and resource server 140, all interconnected over network 150.

Device 110 may be a laptop computer, a tablet computer, a netbook computer, a personal computer, a desktop computer, a personal digital assistants (PDA), a smart phone, a wearable device (e.g., smart glasses, a smart watch, an e-textile, an AR headsets, etc.), or any programmable computer systems known in the art. In an embodiment, other instances of device 110 include other electronic devices of a user, such as a medical device, a fitness device, a music player, an entertainment console, etc. In certain embodiments, device 110 represents a computer system utilizing clustered computers and components (e.g., database server computers, application server computers, etc.) that act as a single pool of seamless resources when accessed through network 150, as is common in data centers and with cloud-computing applications. In general, device 110 is representative of any programmable electronic device or combination of programmable electronic devices capable of executing machine readable program instructions and communicating via network 150 with authorization server 130 and resource server 140. Device 110 may include components, as depicted and described in further detail with respect to FIG. 4, in accordance with embodiments of the present invention.

Device 110 includes application 111, security programs 113, and access token information 115. Device 110 may also include various programs and data, such as a web browser, one or more communication programs, an office productivity suite, security credentials, cryptographic keys, etc. (not shown). A user of device 110 can directly or indirectly access resource 144 of resource server 140 utilizing one or more software programs, such as application 111. In one scenario, application 111 is representative of a native software application executing on device 110. In another scenario, application 111 is a web-based application that device 110 accesses via the Internet.

Security programs 113 includes token reuse program 200 and a plurality of other programs and algorithms (not shown) associated with device 110 obtaining access to one or more protected resources of resource server 140. Security programs 113 may also include other security software, such as access control software, log management software, encryption/decryption algorithms, authentication programs, a firewall program, etc., utilized by other functions and operations of device 110. In one embodiment, in response to an initial authentication by device 110, device 110 downloads (e.g., copies) token reuse program 200 and a set of security programs and other information from authorization server 130 that are respectively assigned to device 110 as part of establishing an authentication protocol. In another embodiment, in response to device 110 authenticating to access another resource server (i.e., resource server 140) of networked computing environment 100, authorization server 130 determines and installs another set of security programs and other information respectively assigned to device 110. In an embodiment, based on the authentication protocols utilized within networked computing environment 100, one or more actions are performed by differing entities, such as device 110 and authorization server 130.

In various embodiments, a set of security programs and other information (not shown) respectively assigned to device 110 include one or more algorithms, hash functions, random value generators, rules, schema, predefined values, etc. The one or more algorithms and functions may include hash functions, pseudorandom value generators, a decryption program, a metadata sequence generator, token analyzing and editing programs, a checksum function, etc., that are stored within security programs 113. Other information and values obtained from authorization server 130 are discussed in further detail with respect to access token information 115 and access token rules 116. In some embodiments, various elements of security programs 113 and access token information 115 are associated with a particular instance of resource 144.

Token reuse program 200 is a program for generating and maintaining a secure reusable access token (i.e., an authorization token) that enables the device of a user to access a protected resource of a resource server. In an embodiment, in response to a user utilizing device 110 to authenticate to resource server 140 to access resource 144, authorization server 130 installs a plurality of elements respectively assigned to device 110 that are utilized by token reuse program 200, such as elements within security programs 113, access token information 115, and access token rules 116. In one embodiment, in response to a request to access resource 144 token reuse program 200 receives an initial authorization token from authorization program 300 that includes a seed value. In various embodiments, token reuse program 200 identifies, extracts, and converts the included seed value to a secure value utilizing one or more rules included within access token rules 116 and one or more aspects of security programs 113.

In another embodiment, token reuse program 200 also utilizes a rule of access token rules 116 to generate a set of pseudorandom insertion locations for secure values utilizing one of the set of algorithm and function of security programs 113. In other embodiments, token reuse program 200 utilizes another rule of access token rules 116 that dictates generating other strings of metadata that encloses a secure value for insertion within a modified access token. Token reuse program 200 may utilize one or more rules and/or predetermined values within access token rules 116 to generate a modified access token (e.g., access token 118) that is transmitted to authorization program 300 for validation. In response to transmitting a valid instance of access token 118, token reuse program 200 obtains access to resource 144.

In some embodiments, token reuse program 200 modifies an instance of access token 118 based on an event or message, such as a session time-out message as opposed to another request to access resource 144. Alternatively, in response to the expiration or revocation access token 118, token reuse program 200 receives a new initial token from authorization program 300 to generate another modified access token (e.g., an instance of access token 118) for validation and access to resource 144.

Access token information 115 includes access token rules 116, secure value(s) 117, and access token 118. In an embodiment, access token information 115 stores a copy of the initial token, sans strings of metadata and the included seed value. In various embodiments, access token information 115 includes a data structure, such as a table or associative array that links and/or cross-references information among applications (e.g., instance of application 111) of device 110, instances of resource server 140, and/or corresponding instances of a protected resource (e.g., resource 144) that are accessed via a respective instance of access token 118. Access token information 115 may include an access session time-out value and/or token expiration value (i.e., a time and date) related to an instance of access token 118. In some embodiments, access token information 115 also includes a unique device ID assigned to device 110 by authorization server 130. In other embodiments, access token information 115 includes one or more dictates related to dispositioning secure values, access tokens, and other information, such as purging by time, loss of a certificate for a resources/resource server, a message from authorization server 130 (e.g., token revoked), etc.

Access token rules 116 include a set of rules, schema, and/or predefined values respectively associated with device 110 for identifying seed values, generating secure values, and modifying reusable access tokens. The set of rules and/or predefined values included within access token rules 116 can be associated with an instance of resource server 140 and may be further associated with a particular instance of resource 144. In an embodiment, in response to an initial authentication by device 110 to access resource server 140, authorization server 130 downloads and stores a copy of a set of rules or predefined values to access token rules 116 that are utilized for generating and/or modifying reusable access tokens.

Examples of some rules within access token rules 116 may include rules related to: identifying strings of metadata and an associated seed value, applying a randomizing factor to a seed value, utilizing a particular hash function or algorithm to convert a seed value to an secure value, inserting a unique device ID within a modified access token at a predefined location, encrypting the unique device ID within the modified access token, and generating one or more locations for inserting a secure value into the modified access token. Another example of a rule related to secure value generation dictates that the prior secure value is utilized as the seed value for a subsequent seed value. Similarly, another rules dictates that some or all of characters of a prior string of metadata for access token 118 generate, based on another function, the characters that form a subsequent string of metadata characters that bracket (e.g., enclose, indicate) the location the secure value within a subsequent instance of access token 118.

In one scenario, access token rules 116 includes one or more rules related to identifying a seed value within an initial token based on prepended and appended strings of metadata that enclose (e.g., bracket) the seed value within an initial token. Rules related to strings of metadata may include the length of the prepended and appended strings of metadata, the number of characters utilized, and an organization of metadata characters. For example, authorization server may dictate that strings of metadata will be each eight characters, comprised of two repeating characters, and are mirrored strings, such as BDBDBDBD (e.g., prepend string) and DBDBDBDB (e.g., append string). In another scenario, authorization server 130 further obfuscates the seed value location within the initial token by including at least one other pair of strings of metadata that includes the unique ID assigned to device 110, such as "QPQPQPQP 12094K63 PQPQPQPQ," or another seed value that is not utilized to generate a secure value. In some scenarios, token reuse program 200 can, based on another predefined rule by authorization server 130, determine which strings of metadata and corresponding seed value to select; and whether to delete unused strings of metadata and corresponding seed values from within a modified access token; or determine to reuse or replace the strings of metadata to identify a secure value.

Still referring to access token rules 116, in some embodiments, rules or schema within access token rules 116 dictate how and/or where a secure value is inserted within a modified token. In one scenario, access token rules 116 include a rule that dictates an insertion point based on a predetermined rule or function common to authorization server 130 and device 110. One schema dictates that the secure value insertion locations are be dynamically generated. Another schema dictates that a table of secure value locations is created based on a predetermined value assigned by authorization server 130. A different schema dictates that the initial string of metadata is utilized by a pseudorandom value generator to generate the table of secure value locations. Secure value insertion locations can be stored within secure value(s) 117. In another scenario, other access token rules dictate the use of prepended and appended strings of metadata to identify a secure value, and that a completely random location is utilized for inserting the strings of metadata and the corresponding secure value.

In other scenarios, access token rules 116 include another schema that affects the method for inserting secure values within an access token. In one example, a schema dictates alternating between predefined pseudo-random locations stored within secure value(s) 117 and a random location where the strings of metadata and the enclosed secure value are inserted. In another example, a different schema dictates modifying the strings of metadata for each new secure value that are inserted within a modified access token (e.g., access token 118).

Secure value(s) 117 include one or more secure values corresponding to access token 118. Secure value(s) 117 may also include a seed value corresponding to an initial token related to access token 118. In some embodiments, secure value(s) 117 store secure values corresponding to differing instances of access token 118, such as an instance of access token 118 associated with a different instance of resource server 140. In another embodiment, secure value(s) 117 retains a copy of a prior secure value that is utilized as a seed value for generating another secure value utilized within a subsequent instance of access token 118. In an embodiment, secure value(s) 117 also includes (e.g., stores) one or more predetermined locations for inserting an instance of secure value(s) 117 within a subsequent (e.g., modified) instance of access token 118. For example, secure value(s) 117 may include a table that indicates that the initial secure value is inserted at location #11, the next secure value is inserted at location #3, the subsequent (i.e., third) secure value is inserted at location #6, etc.

Access token 118 is representative of an access token for accessing resource 144 of resource server 140. In some embodiments, access token 118 includes at least two variants of an access token for accessing resource 144 of resource server 140, such as the initial access token that has the seed value removed and a modified instance of access token 118 that includes the currently determined secure value. In another embodiment, access token 118 can also include a future variant (e.g., next instance) of the access token for resource 144 that includes a determined subsequent instance of the secure value. For example, token resource program 200 generates a future variant of access token 118 to minimize a delay re-establishing access to resource 144 in response to time-out event associated with resource server 140 or regaining access to resource 144 after a connectivity issue associated with network 150. In other embodiments, access token 118 includes a plurality of access tokens respectively associated with different instances of resource server 140 and/or other protected resources.

Authorization server 130 and resource server 140 may be personal computers, desktop computers, mainframe computers, etc. In certain embodiments, authorization server 130 and/or resource server 140 can represent a computer system utilizing clustered computers and components (e.g., database server computers, application server computers, etc.) that act as a single pool of seamless resources when accessed through network 150, as is common in data centers and with cloud-computing applications. In certain embodiments, authorization server 130 and resource server 140 represent a computer system utilizing clustered computers and components (e.g., database server computers, application server computers, etc.) that act as a single pool of seamless resources when accessed through network 150, as is common in data centers and with cloud-computing applications. In general, authorization server 130 and resource server 140 are representative of any programmable electronic device or combination of programmable electronic devices capable of executing machine readable program instructions and communicating via network 150. Authorization server 130 and resource server 140 may include components, as depicted and described in further detail with respect to FIG. 4, in accordance with embodiments of the present invention.

Authorization server 130 is a computing entity, such as a computing system, a hosted server, or a cloud service for authenticating a plurality of computing systems and/or computing devices (e.g., device 110) to access one or more resource servers and to control access to the resource servers and corresponding protected resources utilizing access tokens. Authorization server 130 includes security programs 133, device assignment information 134, access token information 135 and a plurality of other programs and data (not shown). Other programs and data may also include various webpages, applications, and databases, a firewall program, a network redirect program, communication programs, a copy of token reuse program 200, etc.

In various embodiment, in response to an instance of device 110 initially authenticating to access resource 144, authorization server 130 and/or authorization program 300 determines a set of algorithms, functions, and information from among at least security program 133 and access token rules 136 for assigning to the instance of device 110. Because authorization server 130 and/or authorization program 300 assigns the set of algorithms and information to respective instances of device 110, authorization program 300 can replicate values and information associated with an access token that is generated by token reuse program 200, such as secure values, strings of metadata, secure value insertion locations, etc.

Security programs 133 includes authorization program 300 and a plurality of other programs and algorithms (not shown) associated with generating and validating reusable access token to access one or more resources of resource server 140. Security programs 133 also includes libraries of the algorithms, functions, etc., previously discussed with respect to security programs 113 of device 110.

Authorization program 300 is a program that generates and validates reusable access tokens to enable an application executing on a computing device to access a protected resource of a resource server. In one embodiment, authorization program 300 receives a request to access resource 144 that does not include an access token. In various embodiments, authorization program 300 utilizes various algorithms, rules, and/or values access within at least access token information 135, access token rules 136, and respectively associated with device 110 to generate a seed value and insert the seed value within the initial token. Authorization program 300 may store a copy of the initial token, sans the seed value within access tokens 138. Subsequently, authorization program 300 transmits the initial token to device 110 for modification by token resource program 200. The initial access token and seed value are utilized by token reuse program 200 to generate a secure value and create a modified access token.

In some embodiments, authorization program 300 receives a token that includes a secure value. In another embodiment, authorization program 300 determines a secure value corresponding to an access token. In one scenario, authorization identifies and determines the secure value that is included within a modified access token (i.e., access token 118) related to device 110 and resource 144. In another scenario, authorization program 300 determines a secure value based on the seed value that was included within the initial token related to device 110 and resource 144. In response, authorization program 300 determines whether the received instance of access token 118 is valid based, at least in part on (i) determining that seed value-based secure value determined by authorization program 300 is the same as the secure value identified within received access token 118; and (ii) that a stored copy of the initial token is the same as access token 118 without the secure value and associated strings of metadata. If access token 118 is valid, then authorization program 300 notifies token reuse program 200 that application 111 is granted access to resource 144 of resource server 140.

In an embodiment, device assignments 134 is a table or database that stores information related to the plurality of algorithms, functions, rules, schema, and/or predetermined values respectively assigned to differing instances of device 110 for generating and updating reusable access tokens. Device assignments 134 may also include the unique device IDs that correspond to instances of device 110. In some embodiments, device assignments 134 includes information that is further associated with different instances of resource server 140 and/or instances of resource 144. For example, device assignments 134 can include access session time-out values and/or token expiration values related to an access token that is respectively associated with an instance of device 110 and an instance of at least resource 144. In various embodiments, information within device assignments 134 is based on elements of security program 133, access token information 135, access token rules 136, and secure values 137.

Access token information 135 includes access token rules 136, secure values 137, and access tokens 138. In an embodiment, access token information 135 includes dictates (e.g., criteria) related to instances of resource server 140, such as a size of an access token, information included within the access token, an expiration duration to assign to an access token, a list of instances of resources 144 that can be accessed utilizing an access token, etc. In some embodiments, access token information 135 also includes various information discussed with respect to access token information 115 of device 110. In another embodiment, access token information 115 also includes various criteria related to access tokens, such as the conditions that trigger revoking one or more access tokens of a computing device to access a resource server.

Access token rules 136 include a plurality of rules, schema, and/or predefined information for modifying reusable access tokens corresponding to combinations of instances of device 110 and instances of resource server 140. In an embodiment, access token rules 136 includes libraries of the algorithms, functions, etc., previously discussed with respect to access token rules 116 of device 110 and associated examples. Access token rules 136 may also include rules related to dispositioning information associated with the expired or the revoked instance of access token 118. In some embodiments, access token rules 136 also includes rules related to generating access tokens, such as a token size; a method for generating seed values; generating strings of metadata; inserting strings of metadata and an included seed value; including, identifying, and/or decrypting a unique device ID within a modified access token, etc.

Secure values 137 includes (e.g., remotely stores) a plurality of secure values that correspond to a plurality of instances of access token 118 that are respectively associated with combination of instances of device 110 and instances of resource server 140. Secure values within secure values 137 may further associated with specific instances of resource 144. In an embodiment, secure values 137 includes the unique device ID assigned to an instance of device 110. In one embodiment, secure values 137 includes a plurality of secure values that authorization server 130 replicates as a basis for comparison to secure values identified within received instances of access token 118 that were modified by an instance of token reuse program 200.

In various embodiments, secure values 137 is utilized as a storage location for managing seed values that correspond to instances of access token 118. For example, secure values 137 includes the seed value that corresponds to an initial token associated with a request to access resource 144. In response to determining that a modified access token is valid, authorization program 300 may replace the initial seed value within secure values 137 with current secure value; thereby, preparing to utilize the current secure value as the seed value for determining a new secure value during a subsequent access request for resource 144.

In some embodiments, secure values 137 includes a table of pseudorandom insertion locations for secure values utilizing an instance of the algorithm or function that was assigned and copied to device 110, and respectively associated with resource 144. In an example, authorization server 130 generates a table of pseudorandom insertion locations for secure values within access token 118 based on some or all of the string of metadata associated with the seed value, or another predetermined value and rule. In other embodiments, authorization server 130 dynamically determines a location for a secure value within a subsequent instance of access token 118 based on information within the current instance of access token 118, such as some or all of the string of metadata associated with the current secure value or the current secure value.

Access tokens 138 is includes a plurality of instances of an access tokens 118 for accessing a protected resource of a resource server that have been assigned to a computing device. In an embodiment, access tokens 138 includes the initial token for an instance of access token 118, sans strings of metadata and seed values; and respectively associated with combinations of instances of device 110 and instances of resource 144. In some embodiments, access tokens 138 stores temporary copies of received instances of modified access token 118.

Resource server 140 may be representative of a computing system, a storage area network, a networked-attached storage system, cloud storage environment, etc. Resource server 140 includes security programs 142, at least one protected resource (i.e., resource 144) and a plurality of other programs and data (not shown). Security programs 142 includes a suite of programs that control access to and within resource server 140, such as an access control facility, a packet/network address tracking program, a redirect function, etc.

Resources 144 is representative of a protected resource, such as a data file, an image file, a video file, a database, etc. In some embodiments, differing instances of resource 144 may be controlled by different instances of access token 118.

In one embodiment, device 110 communicates through network 150 to authorization server 130 and resource server 140. Network 150 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 150 can be any combination of connections and protocols that will support communications between device 110, authorization server 130, and resource server 140, in accordance with embodiments of the present invention. In various embodiments, network 150 operates locally via wired, wireless, or optical connections and can be any combination of connections and protocols (e.g., personal area network (PAN), near field communication (NFC), laser, infrared, ultrasonic, etc.).

Figure 2:
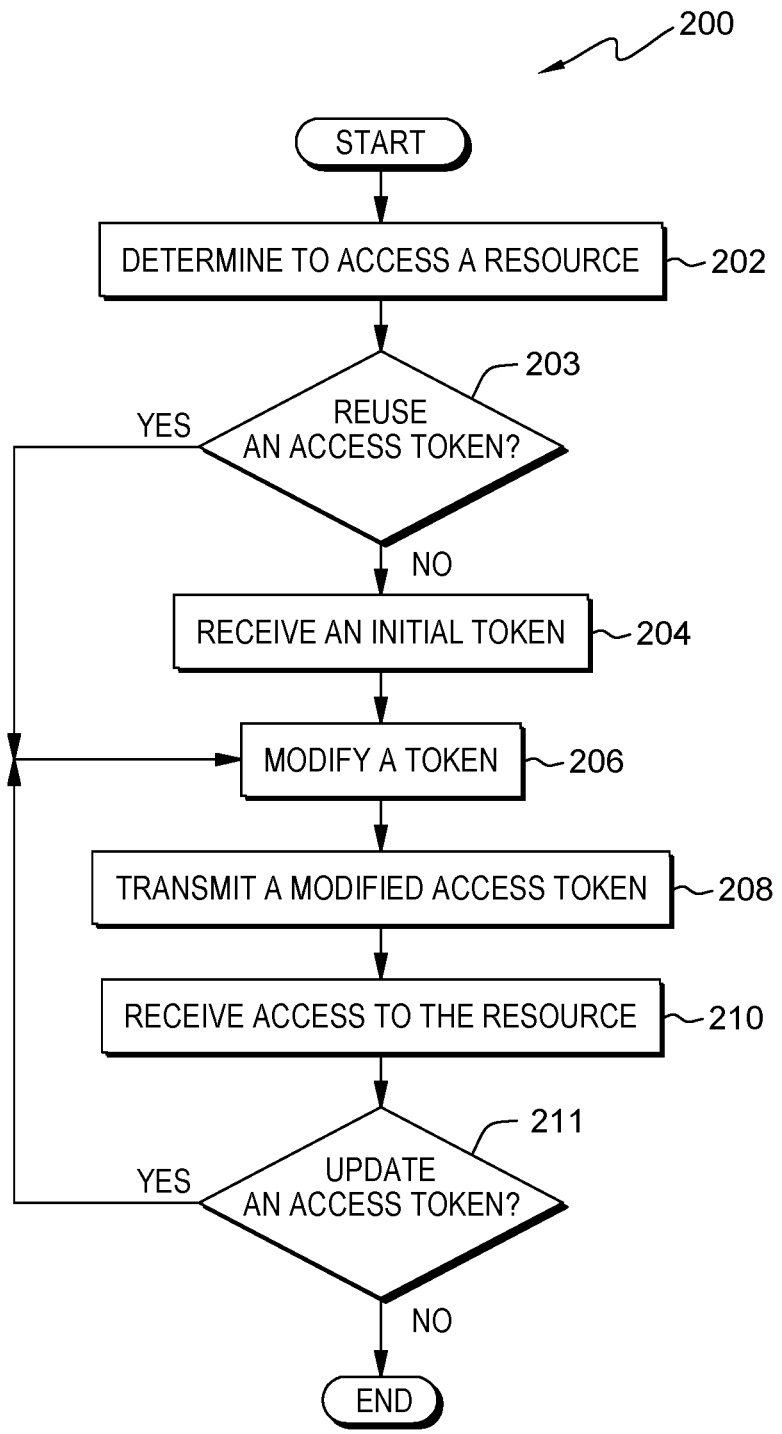
FIG. 2 depicts a flowchart of steps of a token reuse program, in accordance with an embodiment of the present invention.

FIG. 2 is a flowchart depicting operational steps for token reuse program 200, a program for generating and modifying a secure reusable token for accessing a protected resource, in accordance with embodiments of the present invention. In an embodiment, token reuse program 200 activates in response to a request by an application executing on device 110 to access a protected resource of a resource server. In some embodiments, token reuse program 200 can concurrently process multiple authorizations and respective reusable access tokens associated with different executing applications, different resource servers, and/or differing protected resources.

In step 202, token reuse program 200 determines to access a resource. In various embodiments, token reuse program 200 determines to access resource 144 based on application 111 requesting to access resource server 140 and/or resource 144. In one embodiment, responsive to determining to access resource 144, token reuse program 200 interfaces with authorization program 300 of authorization server 130 to obtain an instance of access token 118 related to resource 144. In one scenario, token reuse program 200 determines that the current request to access resource 144 is an initial (e.g., first time) access of resource 144 based on device 110 lacking a credential related to resource server 140. In another scenario, token reuse program 200 determines that the current request to access resource 144 is an initial access of resource 144 based on device 110 lacking an instance of access token 118 related to resource 144 and/or resource server 140.

In another embodiment, token reuse program 200 determines that application 111 has previously accessed resource 144 based on identifying an instance of access token 118 related to resource 144. In some embodiments, token reuse program 200 also determines a status of an access token related to resource 144. In some scenarios, token reuse program 200 determines that the status of the access token related to resource 144 is not expired. In response, token reuse program 200 determines to reuse the access token related to resource 144. In other scenarios, token reuse program 200 determines that the status of the instance of access token 118 related to resource 144 is expired. In one example, token reuse program 200 determines that the status of the instance of access token 118 related to resource 144 is expired based on information within access token information 115 associated with resource 144. In another example, token reuse program 200 determines that the status of the access token related to with resource 144 is expired based on receiving a message from authorization server 130 related to accessing resource 144, such as access denied, access revoked, or the access token for resource 144 has expired.

In decision step 203, token reuse program 200 determines whether to reuse an access token. In one embodiment, token reuse program 200 determines not to reuse an access token because device 110 lacks an instance of access token 118 related to resource 144 of resource server 140. In another embodiment, token reuse program 200 determines not to reuse an access token because the instance of access token 118 related to resource 144 is expired or revoked. In other embodiments, token reuse program 200 determines to reuse an access token because the instance of access token 118 related to resource 144 is not expired.

Responsive to determining not to reuse an access token (No branch, decision step 203), token reuse program 200 receives an initial token (step 204).

In step 204, token reuse program 200 receives an initial token. Token reuse program 200 receives an initial token related to accessing resource 144 from authorization program 300 of authorization server 130. The initial token includes a seed value. In one embodiment, token reuse program 200 receives an initial token related to accessing resource 144 in response to a first-time authentication. In another embodiment, token reuse program 200 receives an initial token related to accessing resource 144 to replace the expired or revoked instance of access token 118 within access token information 115.

In various embodiments, if token reuse program 200 determines that the status of an instance of access token 118 is expired or revoked, then token reuse program 200 determines to disposition the expired or revoked instance of access token 118. Token reuse program 200 utilizes one or more rules within access token rules 116 to disposition the expired instance of access token 118. In an example, access token rules 116 may dictated that token reuse program 200 deletes the expired or revoked instance of access token 118, purges the seed value and secure values corresponding to the expired or revoked instance of access token 118, and deletes the table of insertion locations for secure values.

In step 206, token reuse program 200 modifies a token. In one embodiment, in response to receiving an initial token, token reuse program 200 extracts the seed value included within the initial token. Token reuse program 200 may store the extracted seed value within secure value(s) 117. Alternatively, token reuse program 200 buffers the seed value in memory. In one scenario, token reuse program 200 identifies the seed value based on a first rule included within access token rules 116, to identify a seed value utilizing strings of metadata prepended and appended bracketing the seed value within the initial token related to accessing resource 144. In another scenario, token reuse program 200 identifies the seed value based on a second rule included within access token rules 116, for selecting among differing strings of metadata that enclose (e.g., bracket) the different seed values within the initial token. In an embodiment, token reuse program 200 deletes associated strings of metadata from the initial token in addition to removing the identified seed value. Token reuse program 200 stores the remainder of the initial token within access token information 115.

In some embodiments, token reuse program 200 modifies the initial token utilizing an initial seed value included within the initial token and one or more algorithms or functions within security programs 113 to generate a secure value that is inserted within the initial token to create a modified access token. In an example, token reuse program 200 determines that authorization program 300 encrypts seed values. Token reuse program 200 decrypts the seed value and applies a predetermined algorithm or function to generate a secure value. Token reuse program 200 may also store the generated secure value within secure value(s) 117. In addition, token reuse program 200 utilizes another rule within access token rules 116 to determine the method or schema utilized to determine the insertion location of the generated secure value. In one example, token reuse program 200 generates a table of pseudorandom insertion locations for secure values (example previously discussed with respect to the discussion of secure value(s) 117).

Still referring to step 206, in another embodiment if access token rules 116 dictate that an access token includes a unique device ID, then token reuse program 200 inserts the unique device ID for device 110 within the modified access token based on another rule of access token rules 116, such as a predefined location and/or encrypting the unique device ID. In various embodiment, token reuse program 200 stores a modified access token as an instance of access token 118.

Referring to decision step 203, responsive to determining to reuse an access token (Yes branch, decision step 203), token reuse program 200 modifies a token (step 206).

Referring again to step 206, in other embodiments token reuse program 200 modifies the stored instance of access token 118 utilizing on the prior secure value, included within secure value(s) 117, as the seed value for the predetermined algorithm or function by generating a new secure value. Token reuse program 200 deletes the prior secure value from within secure value(s) 117. Token reuse program 200 stores the new secure value related to resource 144 within secure value(s) 117. In an embodiment, token reuse program 200 also inserts a copy of the new secure value at different location within the instance of access token 118 or within a copy of the initial token sans the strings of metadata and one or more seed values. Token reuse program 200 utilizes methods and schema previously discussed to determine a location (e.g., an insertion point) for the new secure value.

In step 208, token reuse program 200 transmits a modified access token. In one embodiment token reuse program 200 identifies transmits a modified instance of access token 118 related to accessing resource 144 to authorization server 130 for verification by authorization program 300. In response, token reuse program 200 receives one or more messages related to accessing resource 144, such as access is granted, a time-out countdown duration value, access is denied, access token is revoked, access token has expired, etc.

In some embodiments, responsive to identifying that access to resource 144 was denied, token reuse program 200 restarts from Step 204 until access is granted, a lock-out message is received, or a predetermined number of retries is exceeded. In an example, token reuse program 200 receives a message indicating that authorization program 300 determined that access token 118 has expired. In response, token reuse program 200 may request a new initial token and perform one or more disposition actions related to the expired instance of access token 118.

In step 210, token reuse program 200 receives access to the resource. In an embodiment, token reuse program 200 determines that access to resource 144 is granted based on a message received from authorization server 130. In some scenarios, in response to access being granted application 111 access resource 144. In other scenarios, in response to access being granted token reuse program 200 utilizes an aspect of security programs 113 to indicate to application 111 that access has been granted and that application 111 can access resource 144.

In some embodiment, responsive to determining that access to resource 144 is granted token reuse program 200 may pause at step 210 until application 111 ceases to access resource 144, application 111 terminates, a status associated with resource 144 changes. In some scenarios, resource 144 and/or resource server 140 include access session time-out dictates. If application 111 attempts to utilize resource 144 beyond the access session time-out period, then token reuse program 200 receives an access time-out message. In response, token reuse program 200 can regain access to resource 144 by updating access token 118. In another scenario, token reuse program 200 receives a message that includes a count-down time indication or an access limit durations. In response to token reuse program 200 determining that application 111 accesses resource 144 to within a threshold period of time of the access duration limit, token reuse program 200 can pre-emptively update access token 118.

In decision step 211, token reuse program 200 determines whether to update an access token. In one embodiment, token reuse program 200 determines to update access token 118 based on a time-out message. In another embodiment, token reuse program 200 determines to pre-emptively update access token 118 prior to application 111 exceeding an access duration limit for resource 144.

Responsive to determining to update an access token (Yes branch, decision step 211), token reuse program 200 modifies an access token (step 206).

Referring to decision step 211, in one embodiment, responsive to determining not to update an access token (No branch, decision step 211), token reuse program 200 terminates. For example, application 111 terminates and access to resource 144 ceases. In another embodiment, responsive to determining not to update access token 118 because access token 118 has expired or is revoked while accessing resource 144 (No branch, decision step 211), token reuse program 200 restarts to obtain an initial token from authorization program 300 of authorization server 130.

Figure 3:
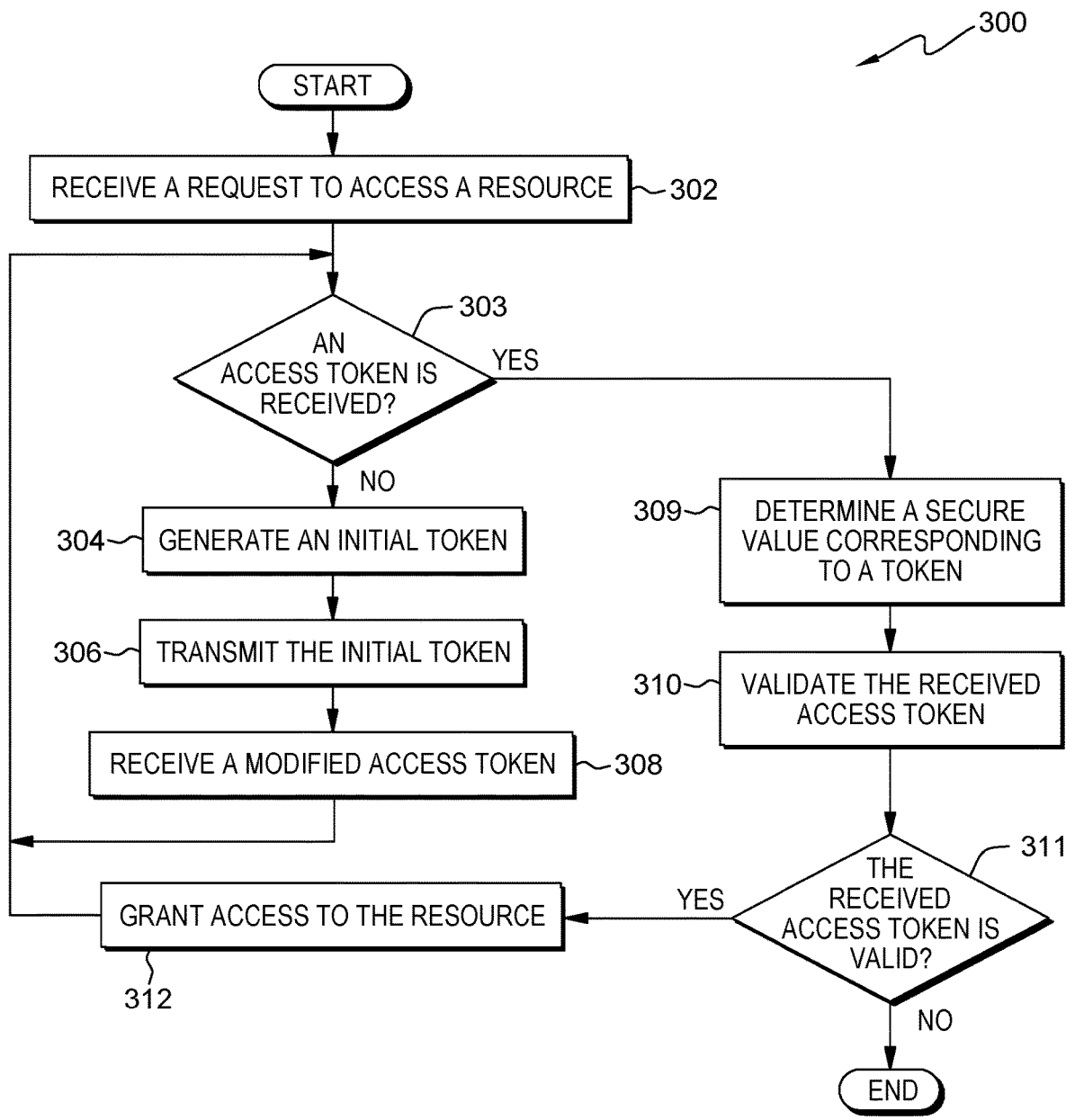
FIG. 3 depicts a flowchart of steps of an authorization program, in accordance with an embodiment of the present invention.

FIG. 3 is a flowchart depicting operational steps for authorization program 300, a program that grants access to a protected (e.g., restricted, controlled, etc.) resource based on generating a reusable access token that is dynamically modified by a client device and validating against the modified access token, in accordance with embodiments of the present invention. In some embodiments, authorization program 300 processes requests by device 110 to access a plurality of protected resources. In other embodiments, authorization program 300 can process access request for a plurality of protected resources from a plurality of devices.

In step 302, authorization program 300 receives a request to access a resource. In one embodiment, if authorization program 300 determines that the request from device 110 to access resource 144 of resource server 140 is a first-time access request, then authorization program 300 determines to respectively assign one or more algorithms, functions, rules, schema, and/or predefined values to device 110. Authorization program 300 stores information related to the assignments of algorithms, functions, rules, schema, and/or predefined values to device 110 within device assignments 134. In response, authorization program 300 downloads (e.g., copies), to device 110, one or more assigned algorithms and/or functions to security programs 113. Authorization program 300 also copies the assigned rules, schema, and/or predefined values (e.g., a unique device ID for device 110) to at least access token rules 116.

In some embodiment, authorization program 300 receives a request to from device 110 to access resource 144 of resource server 140 that lacks an access token. In one scenario, in response to a first-time access request by device 110 to access resource 144, authorization program 300 does not receive an access token. In another scenario, in response to token reuse program 200 determining that the status of access token 118 is expired or revoked, authorization program 300 does not receive access token 118.

In various embodiments, authorization program 300 receives a request to from device 110 to access resource 144 of resource server 140 that includes an instance of access token 118. In one scenario, authorization program 300 determines that the status of received instance of access token 118 is not expired. Authorization program 300 may store the received instance of access token 118 to access tokens 138. In another scenario, authorization program 300 determines that the status of received instance of access token 118 is expired or revoked. In response, authorization program 300 deletes the expired instance of access token 118. Authorization program 300 may also disposition other information associated with the expired or the revoked instance of access token 118, such as deleting secure values stored within secure values 137 and deleting the initial instance of the access token stored within access tokens 138.

In decision step 303, authorization program 300 determines whether a token is received. In one embodiment, authorization program 300 determines that a token is received based on receiving an instance of access token 118 that is not expired. In another embodiment, authorization program 300 determines that an access token was not received based on determining that the request to access resource 144 did not include an access token, or that the request to access resource 144 included an access token that is expired or revoked.

Responsive to determining that a token was not received (No branch, decision step 303), authorization program 300 generates an initial token (step 304).

In step 304, authorization program 300 generates an initial token. In one embodiment, authorization program 300 generates initial token based on various criteria included within access token information 135 related to resource 144. In various embodiments, authorization program 300 also generates a seed value that is inserted within the initial token based on rules within access token rules 136 that are also included within access token rules 116 respective associated with an instance of device 110. The rules related to a seed value and an initial token may include encrypting (e.g., hashing) the seed value, determining a string of metadata to prepend and append to the seed value, and/or a rule associated with obfuscating the seed value, such as including multiple sets of strings of metadata and see values.

In an embodiment, if access token rules 136 dictate that an access token includes a unique device ID, then authorization program 300 does not include the unique device ID corresponding to device 110 within the original access token. In some embodiments, authorization program 300 stores the initial token sans the strings of metadata and the seed value within access tokens 138. In addition, authorization program 300 may store the seed value corresponding to the initial token within secure values 137.

In step 306, authorization program 300 transmits the initial token. In an embodiment, authorization program 300 transmits an initial token to device 110 that corresponds to the request to access resource 144 of resource server 140.

In step 308, authorization program 300 receives a modified token. In an embodiment, in response to transmitting an initial token to device 110, authorization program 300 receives, from device 110 a modified instance of access token 118 corresponding to the request to access resource 144. The modified instance of access token 118 includes a secure value based on the seed value included within the initial token. In response to receiving a modified version of access token 118, authorization program 300 loops to decision step 303.

Referring to decision step 303, responsive to receiving a token (Yes branch, decision step 303), authorization program 300 determines a secure value corresponding to the token (step 309).

In step 309, authorization program 300 determines a secure value corresponding to a token. In some embodiments, authorization program 300 utilizes one or more algorithms and/or functions, within security program 133, that are respectively associated with device 110 and resource 144 to determine a secure value corresponding to a copy of a seed value of an instance of access token 118. In one scenario, authorization program 300 determines a secure value corresponding to the seed value stored within secure values 137 for access token 118. In another scenario, authorization program 300 determines a new secure value based on utilizing a copy of the prior secure value corresponding to access token 118, stored within secure values 137, as a new seed value.

In other embodiments, authorization program 300 identifies and determines a secure value included in the received instance of access token 118 (e.g., a modified access token). In some scenarios, authorization program 300 identifies the secure value within the modified instance of access token 118 based on one or more rules associated with strings of metadata. In other scenarios, authorization program 300 identifies the secure value within the modified instance of access token 118 based on one or more rules and/or algorithms related to predetermined (e.g., pseudorandom) insertion locations.

In step 310, authorization program 300 validates the received token. In various embodiments, authorization program 300 validates the received instance of access token 118 token by first comparing the secure value identified within received instance access token 118 to the determined secure value corresponding to access token 118 stored within secure values 137. In one scenario, if authorization program 300 cannot identify a secure value within the received instance of access token 118, then authorization program 300 determines that the received instance of access token 118 is not valid. In another scenario, if authorization program 300 determines that the secure value within the received instance of access token 118 is at a different from a predetermined location, then authorization program 300 determines that the received instance of access token 118 is not valid. In other scenarios, if authorization program 300 cannot identify the unique device ID corresponding to device 110, then authorization program 300 determines that the received instance of access token 118 is not valid.

In an embodiment, if the secure value within the received instance of access token 118 matches the secure value corresponding to device 110 and resource 144 within secure values 137, then authorization program 300 performs a comparison (i.e., a validation) between the received instance access token 118 and the original access token corresponding to device 110 and resource 144 within access tokens 118.

In decision step 311, authorization program 300 determines whether the received token is valid. Responsive to determining that the received token is valid (Yes branch, decision step 311), authorization program 300 grants access to the resource (step 312).

In step 312, authorization program 300 grants access to the resource. In one embodiment, authorization program 300 grants access for application 111 of device 110 to access resource 144 of resource server 140. In another embodiment, authorization program 300 grants permission to application 111 of device 110 to access resource 144 by enabling an automatic redirect of requests to access by device 110 from authorization server 130 to resource server 140 during an access session.

In various embodiments, in addition to granting access to resource 144, in response to authorization program 300 determining that the received instance of access token 118 is valid, authorization program 300 replaces the prior secure value for access token 118 within secure values 137 with a new secure value generated in response to inputting the prior secure value for access token 118 into the algorithm or function respectively associated with device 110 and resource 144.

Referring to decision step 311, in one embodiment responsive to determining that the received access token is not valid (No branch, decision step 311), authorization program 300 terminates. In some embodiments, responsive to determining that the received instance of access token 118 is not valid (No branch, decision step 311), authorization program 300 transmits one or more messages to token reuse program 200 of device 110 indicating a reason why the received instance of access token 118 is not valid. Authorization program 300 may also transmit one or more messages to resource server 140 indicating that one or more validation attempts to access resource 144 failed. In another embodiment, authorization program 300 can receive a message from security program 142 of resource server 140 indicating to revoke access token 118 based on exceeding the threshold level of failed authorization attempts. In response, authorization program 300 may disposition information, values, and/or access tokens within access token information 135 related to access token 118.

Figure 4:
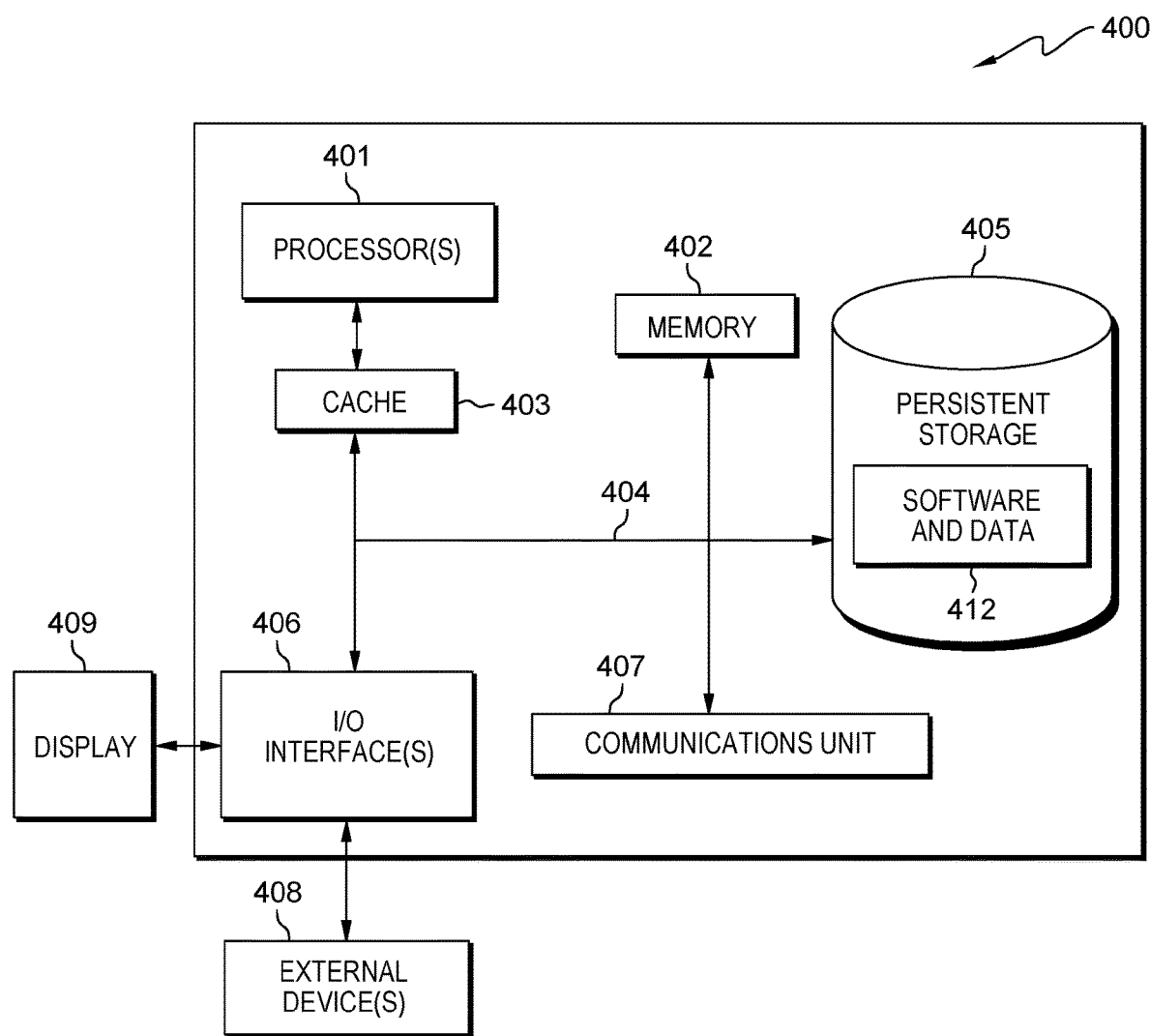
FIG. 4 is a block diagram of components of a computer, in accordance with an embodiment of the present invention.

FIG. 4 depicts computer system 400, which is representative of device 110, authorization server 130, and resource server 140. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to device 110, software and data 412 includes application 111, security programs 113, access token information 115, access token rules 116, secure value(s) 117, access token 118, token reuse program 200, and other programs and data (not shown). With respect to authorization server 130, software and data 412 includes security programs 133, access token information 135, access token rules 136, secure values 137, access tokens 138, authorization program 300, and other programs and data (not shown). With respect to an instance of resource server 140, software and data 412 includes resource 144, and other data and programs (not shown).

Communications unit 407, in these examples, provides for communications with other data processing systems or devices, including resources of authorization server 130, resource server 140, and instances device 110. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   generating, by one or more computer processors, an initial token, wherein the initial token is associated with a remotely stored backup copy of the initial token;
   transmitting, by one or more computer processors, the initial token to a client device;
   receiving, by one or more computer processors, a modified token from the client device;
   responsive to receiving the modified token, determining, by one or more computer processors, that the received modified token is valid, wherein determining that the received modified token is valid further comprises:
     determining, by one or more computer processors, a secure value that corresponds to a remotely stored backup copy of a seed value that corresponds to the initial token;
     determining, by one or more computer processors, that the received modified token includes a first secure value that is the same as the determined secure value;
     identifying, by one or more computer processors, between two strings of metadata within the received modified token, a string of characters, wherein the identified string of characters correspond to the first secure value within the received modified token; and
   responsive to determining that the received modified token is valid, granting, by one or more computer processors, access to a protected resource.

2. The method of claim 1, wherein generating the initial token further comprises:

creating, by one or more computer processors, a seed value, wherein the seed value is associated with the remotely stored backup copy of the seed value and corresponds to the initial token; and inserting, by one or more computer processors, the seed value within the initial token.

3. The method of claim 2, wherein the seed value is inserted at a random location within the initial token.

4. The method of claim 2, further comprising:

determining, by one or more computer processors, a first string of metadata and a second string of metadata;

prepending, by one or more computer processors, the first string of metadata to the seed value; and appending, by one or more computer processors, the second string of metadata to the seed value.

5. The method of claim 1, wherein determining that the modified token is valid further comprises:

determining, by one or more computer processors, that the received modified token includes a unique ID that is assigned to the client device.

6. A computer program product comprising:

one or more computer readable storage media and program instructions stored on the one or more computer readable storage media, the program instructions readable/executable by one or more computer processors:

program instructions to generate an initial token, wherein the initial token is associated with a remotely stored backup copy of the initial token;

program instructions to transmit the initial token to a client device;

program instructions to receive a modified token from the client device;

program instructions to respond to receiving the modified token, by determining that the received modified token is valid, wherein program instructions to determine that the received modified token is valid further comprise:

program instructions to determine a secure value that corresponds to a remotely stored backup copy of a seed value that corresponds to the initial token; and program instructions to determine that the received modified token includes a first secure value that is the same as the determined secure value;

program instructions to identify, between two strings of metadata within the received modified token, a string of characters, wherein the identified string of characters correspond to the first secure value within the received modified token; and program instructions to respond to determining that the received modified token is valid, by granting access to a protected resource.

7. The computer program product of claim 6, wherein program instructions to generate the token further comprise:

program instruction to create a seed value, wherein the seed value is associated with the remotely stored backup copy of the seed value and corresponds to the initial token; and program instruction to insert the seed value within the initial token.

8. The computer program product of claim 7, wherein the seed value is inserted at a random location within the initial token.

9. The computer program product of claim 7, further comprising:

program instructions to determine a first string of metadata and a second string of metadata;

program instructions to prepend the first string of metadata to the seed value; and program instructions to append the second string of metadata to the seed value.

10. The computer program product of claim 6, wherein program instructions to determine that the modified token is valid further comprise:

program instructions to determine that the received modified token includes a unique ID that is assigned to the client device.

11. A computer system comprising:

one or more computer processors;

one or more computer readable storage media; and program instructions stored on the computer readable storage media for execution by at least one of the one or more computer processors, the program instructions comprising:

program instructions to generate an initial token, wherein the initial token is associated with a remotely stored backup copy of the initial token;

program instructions to transmit the initial token to a client device;

program instructions to receive a modified token from the client device;

program instructions to respond to receiving the modified token, by determining that the received modified token is valid, wherein program instructions to determine that the received modified token is valid further comprise:

program instructions to determine a secure value that corresponds to a remotely stored backup copy of a seed value that corresponds to the initial token; and program instructions to determine that the received modified token includes a first secure value that is the same as the determined secure value;

program instructions to identify, between two strings of metadata within the received modified token, a string of characters, wherein the identified string of characters correspond to the first secure value within the received modified token; and program instructions to respond to determining that the received modified token is valid, by granting access to a protected resource.

12. The computer system of claim 11, wherein program instructions to generate the token further comprise:

program instruction to create a seed value, wherein the seed value is associated with the remotely stored backup copy of the seed value and corresponds to the initial token; and program instruction to insert the seed value within the initial token.

13. The computer system of claim 12, wherein the seed value is inserted at a random location within the initial token.

14. The computer system of claim 12, further comprising:

program instructions to determine a first string of metadata and a second string of metadata;

program instructions to prepend the first string of metadata to the seed value; and program instructions to append the second string of metadata to the seed value.

* * * * *